United States Patent [19]
Romrell

[11] 3,772,699
[45] Nov. 13, 1973

[54] RADIO NAVIGATION PULSE PAIR DETECTOR

[75] Inventor: Glyn K. Romrell, Salt Lake City, Utah

[73] Assignee: E-Systems Incorporated, Dallas, Tex.

[22] Filed: Aug. 23, 1972

[21] Appl. No.: 282,978

[52] U.S. Cl. .............................. 343/17.1, 343/6.8 R
[51] Int. Cl. ........................... G01s 7/34, G01s 9/56
[58] Field of Search ................... 343/6.8 R, 6.8 LC, 343/17.1

[56] References Cited
UNITED STATES PATENTS

| | | | |
|---|---|---|---|
| 3,168,731 | 2/1965 | Shub et al. ....................... | 343/6.8 R |
| 3,178,705 | 4/1965 | Clock et al. ..................... | 343/6.8 LC |
| 3,208,065 | 9/1965 | Gutleber et al. ............... | 343/17.1 R |

Primary Examiner—Malcolm F. Hubler
Attorney—James D. Willborn et al.

[57] ABSTRACT

In a radio navigation system responding to an interrogation pulse pair there must be a reliable determination of when the system receiver is being interrogated by an aircraft, preferably without decreasing the receiver sensitivity. A radio navigation system of the type described receives a pair of interrogation pulses which are decoded into a single pulse for operation of a reply transmitter. An interrogation pulse pair detector decodes the interrogation pulses only during the active time span thereof by first amplifying and detecting the pulse level. A negative clipper circuit responds to the amplified pulse pair and is adjusted to blank-out that portion of the amplifier output signal below a preset level. This eliminates the system blanking pulses present in some systems, as well as most low level noise pulses. The clipped interrogation pulses are applied to a modified correlator wherein they are multiplied together by passing one pulse through a delay line and integrating the output pulse. The integrated pulse is applied to a comparator for generating a single decoded pulse when the modified correlator output exceeds a reference level. The transmitter generates position determining signals in response to the single decoded pulse.

12 Claims, 4 Drawing Figures

RADIO NAVIGATION PULSE PAIR DETECTOR

This invention relates to a spaced pulse pair detector and more particularly to a spaced pair detector for decoding a pair of interrogation pulses in a radio navigation system.

Radio navigation systems of the type wherein the present invention finds application includes, but is not limited to, the TACAN or DME systems. Both the TACAN (Tactical Air Navigation System) and DME (Distance Measuring Equipment) rely upon receiving an interrogation pulse from an aircraft desiring position data and transmitting the reply to the aircraft in response to a decoded pulse signal. Usually, the interrogation is by way of a pair of pulses separated by a fixed spacing such as 12 microseconds. For effective operation of the TACAN or DME system, it is essential that a reply pulse be triggered by two interrogation pulses, separated by the fixed spacing of 12 microseconds, and not by one interrogation pulse and noise or strictly noise signals. Apparatus for responding to a decoded pulse signal and generating a reply signal to an interrogating aircraft includes many well known circuit configurations.

Heretofore, an interrogation pulse pair was detected by using a level detector connected to the system receiver video output. This technique is useful only for interrogations that are at a level higher than an established reply rate. This is becuase the amplitude of the noise pulses at the receiver video output can be as high as the interrogation pulse amplitude at low interrogation levels. A common problem associated with TACAN and other radio navigation ground transponders located in areas that receive considerable noise input is that of a false range lock-on of the airborne equipment.

Radio navigation systems which rely on pulse pair interrogations to activate the system thus require accurate and reliable detection of the interrogation pulse pair. Pulse trains of radio frequency energy received by the system have a predetermined fixed time spacing characteristic. Other characteristics of the interrogation pair, such as the amplitude, may vary over considerable limits and thus does not provide reliable pulse pair detection. Thus for reliable pulse pair detection, it is necessary that the system recognize a pulse pair as a signal, regardless of its amplitude, and decode the pair on the basis of the pulse pair time spacing.

Reliable detection of a pulse pair is only achieved by noise rejection and in a system capable of distinguishing between when a pulse pair signal is received and when a single pulse is received along with noise at a given time interval, instead of the second pulse of a signal pair. In addition, the pulse pair detector must also distinguish between noise impulses received at a given time spacing, instead of both a first and second pulse signal.

A feature of the present invention is to provide a pulse pair detector that generates a detection signal from a true pulse pair spaced over a preselected time interval. A further feature of the present invention is to provide a pulse pair detector wherein noise signals are rejected when appearing at the preselected time interval. Still another feature of the present invention is to provide a pulse pair detector in a radio navigation system for decoding an interrogating pulse pair.

In accordance with the present invention, a spaced pulse pair detector includes an amplifier for receiving at an input thereto the spaced pulse pair and having a second input connected to an adjustable signal source for biasing the output of the amplifier to the preset level. Connected to this amplifier output is a clipping circuit for limiting the output signal to above an established value. An output from the clipping circuit is applied to a correlator having an output varying in accordance with a multiplication of the pulse pair and an integration of the resultant pulse. This integrated pulse is connected to a detector for generating a detection signal when the integration signal exceeds an established level.

In accordance with a more specific embodiment of the invention, a radio navigation system having a station for receiving pulse pair signals and for responding thereto includes a receiver of the pulse pair. Connected to the receiver is a pulse pair detector having an amplifier for receiving at an input thereto the spaced pulse pair and an output biased to a preset level. A clipping circuit connected to the output of the amplifier limits the output signal to above an established value. A correlator responds to the output of the clipping circuit and generates an output varying in accordance with a multiplication of the pulse pair and an integration of the resultant pulse. A detector is coupled to the correlator and generates a detection signal when the integration signal exceeds an established level.

A more complete understanding of the invention and its advantages will be apparent from the specification and claims and from the accompanying drawings illustrative of the invention.

Referring to the drawings.

In a TACAN system, a ground station receiver is interrogated by pulse pairs, the pulses of a pair being separated by 12 microseconds in one mode of operation. In response to the received pulse pair, a ground station transmitter is caused to be triggered and to transmit other pulse pairs, the distance measuring being accomplished by metering the time lapse between the interrogation and response pulse signals plus a fixed delay inherent in the equipment. With the present invention, the sensitivity of the system is maintained at a desired level and false interrogation pulses are ignored by a pulse detector responsive to only a true pulse pair. Since the present invention responds only to a true pulse pair at a high system sensitivity and not noise or signal reflections, it eliminates false range lock-on where the airborne interrogator is designed to lock-on only to signals occurring repeatedly in a relatively narrow time slot. This is achieved by biasing the input signal to a preset level and clipping the processed signal to above the preset level. The pulse pair in the clipped signal are then multiplied together with the result being integrated and connected to a comparator circuit. By controlling the integrator time constant only a true pulse pair generates a signal that activates the comparator.

Figure 1:
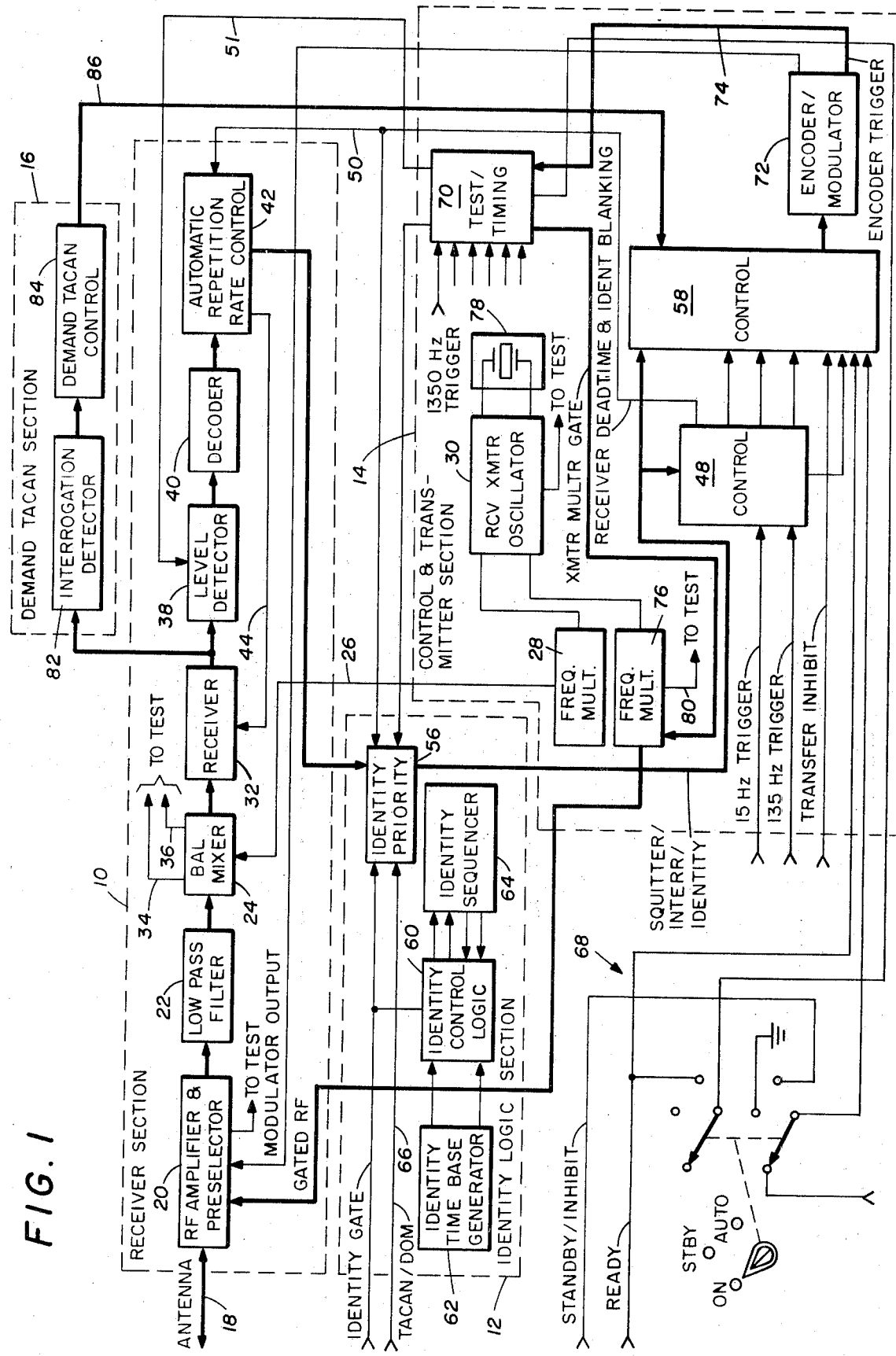
FIG. 1 is a block diagram illustrating a TACAN type radio navigation ground transponder as one application of the pulse detector of the present invention.

Referring to FIG. 1, there is shown a block diagram of a TACAN receiver-transmitter including a receiver section 10, an identity logic section 12, a control and transmitter section 14 and a demand TACAN section 16. Fundamentally, the receiver-transmitter detects and decodes weak TACAN interrogations at one frequency and generates high-power TACAN replies at another frequency, but combined with this transponding function is a function of maintaining a constant average transmit power. Random squitter transmissions are also automatically inserted between reply transmissions such that the average power output level is maintained constant. This insures that the amplitude modulation of the broadcasted TACAN pulse train is due strictly to antenna rotation and not the receiver-transmitter unit output variations. Another function of the system of FIG. 1 is to produce a Morse code identification message without changing the average transmitter power. This is accomplished by momentarily switching from transmission of replies and random pulses to transmission of a pulse pattern having approximately the same total pulse rate. The distance measuring transponding function of the system is inhibited while the Morse code tones are in progress, as these interruptions are short enough to be insignificant.

The receiver section 10 receives and logically recognizes aircraft interrogations on an antenna line 18 coupled to an antenna of the type disclosed in the copending application of Sidney Pickles et al., Radio Frequency Antenna System, Ser. No. 224,783, filed Feb. 9, 1972. In addition, the receiver section initiates reply commands to the antenna also over the line 18. High power transmitted energy is blocked from entering the receiver section by a circuit which discriminates against the transmit frequency. Interrogations arriving on the antenna line 18 are applied to a radio frequency amplifier and preselector module 20 containing a passive R.F-line section which serves to separate the received and transmitted signals by a frequency selection process. This line section acts as a switch to channel the interrogation signal to the receiver section and the signal to be transmitted to the antenna via the antenna line 18. The preselector of the module 20 further provides rejection of signals arriving at incorrect frequencies and specifically rejects signals at the image frequencies.

Signals arriving at the correct frequencies pass through the module 20 and are applied to a low pass filter 22 which provides further rejection of signals above an established frequency. Typically, the low pass filter 22 is a coaxial filter with an input and output impedance matched at a selected impedance level. From the filter 22, the interrogation signal is applied to a balanced mixer 24 where the signal beats with a local oscillator signal on line 26 as generated at the output of a frequency multiplier 28 coupled to a receiver-transmitter oscillator 30. The beat frequency signal from the balanced mixer 24 is connected to a receiver subassembly module 32 and in addition test signals are provided from the balanced mixer on lines 34 and 36.

Figure 2:
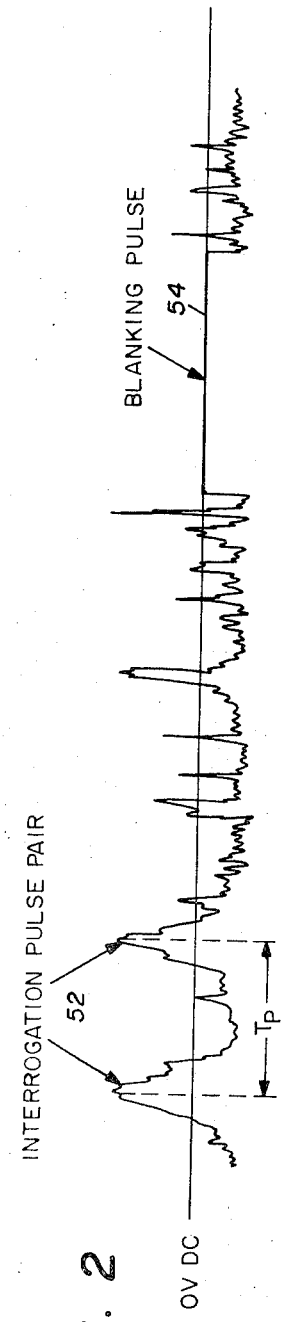
FIG. 2 is a plot of amplitude versus time for an output signal for the receiver of FIG. 1.

The receiver module 32 contains an I.F. amplifier and a discriminator to amplify the beat frequency signal and convert it into a video signal. An output from the discriminator is applied via a video amplifier (not shown) to a level detector module 38. In addition, an output from a receiver subassembly module 32 is applied to the demand TACAN section 16, as will be explained. The level detector module 38 produces a constant amplitude pulse timed from the half-amplitude point of the leading edge of the received input pulse. A blanking pulse is applied to the level detector 38 from a test/timing module 70 of the section 14 over line 51. This pulse is generated during transmission of a reply or a squitter pulse pair and is used to blank the receiver output to prevent a response to the transmitted pair. Graphically, the relationship between an interrogation pulse pair 52 and a blanking pulse 54 is shown in FIG. 2.

Pulses produced at the output of the level detector 38 are connected to a decoder 40 where only the correctly spaced pulses (e.g., 12 microseconds) are accepted. Signals passing from the decoder 40 are applied to an automatic repetition rate control module 42 including an automatic sensitivity control circuit to keep the transponder duty cycle nearly constant under varying conditions of interrogation loading. An output of the automatic sensitivity control circuit is applied by means of a line 44 to the I.F. amplifier of the receiver module 32 to control the gain and stabilize the output pulse count to compensate for conditions ranging from no interrogation to interrogation overloading. The automatic repetition rate control module 42 generates squitter pulses along with the interrogation pulses on line 46 to maintain a constant duty cycle even if continuous wave jamming occurs.

A receiver dead time signal is applied to the module 42 from a control module 48 of the section 14 over a line 50. The receiver dead time gate is generated after each transmitted output pulse to prevent the passage of another pulse until after the daad time has elapsed. This arrangement helps to suppress echos that may exist because of the site location.

The identity logic section 12 generates the identifying message applied to the antenna line 18 and injects it into the transmitted output at the proper time intervals. The message consists of the station call letters sent in international Morse code. Output pulses from the receiver section 10 as appearing on the line 46 are applied to an identity priority module 56. During most of the total operating time, the identity priority module 56 passes squitter-interrogation signals through to the control module 48 and a control module 58 in the section 14. An identity generating circuit periodically calls for transmission of identification information. During these periods, the identity priority card blocks all receiver output pulses and substitutes the identity signal. The identity signal consists of a consistent pattern of pulses at a 1,350 Hz repetition rate. The pulses are keyed in international Morse code by an identity control logic module 60 in the section 12. A group of code selector switches (not shown) on the receiver-transmitter front panel are set for the desired identity code. Normally, identity pulses are derived from reference triggers generated in the antenna assembly except when the transponder is operating in the distance only mode (DOM). Under this condition, the 1,350 Hz identity pulses are generated by a signal generated in the identity priority module 56. The identity control logic receives time based pulses from a time based generator 62 and is interconnected with an identity sequencer 64 to provide the proper time base for the identity logic section 12. Also coupled to the logic section 12 is a TACAN/DOM signal on line 66 for establishing when the transponder operates in the DOM mode or the TACAN mode.

The control and transmitter section 14 processes pulses received from the identity priority module 56 and converts them into high energy R.F. pulses at the transmit frequency. The output pulse train consists of either the receiver output pulses or the identity pulses as applied to the control units 48 and 58. The control unit 48 generates a North reference burst pulse group and an auxiliary reference burst pulse group which are inserted into the output pulse train for bearing information. The reference bursts are generated using 15 Hz and 135 Hz reference trigger inputs from the antenna assembly as described in the copending application of Sidney Pickles et al., Radio Frequency Antenna System. The control unit 48 also establishes precedence for these signals over the receiver and identity signals. The control module 58 receives signals from the control module 48 along with a transfer inhibit, and standby inhibit signal from a control transfer switch 68. In addition, the control module 58 receives through the switch 68 a test/timing gating signal from a test/timing module 70.

If a fault is detected in the receiver-transmitter operation, a low level signal from the control-transfer switch 68 causes the control module 58 to block the output of the unit and allows a standby unit to begin operation. With all signals present, the output of the control module 58 is an encoder-trigger signal containing all the information to be transmitted. An encoder-modulator module 72 accepts the control circuit output and generates the 12 microsecond pair of reply pulses on a line 74. The modulator circuit portion of the module 72 processes the encoder circuit output pulses and generates a pulse to gate on a transmitter frequency multiplier 76 through the testing/timing module 70. The transmitter frequency multiplier 76 connectes to the receiver-transmitter oscillator 31 which may be an oscillator circuit having frequency control by coupling to a crystal 78. The transmitter frequency multiplier 76 delivers a gated R.F. pulse to the R.F. amplifier and preselector 20 and triggers a blanking gate via a signal transmitted to the module 70 over a line 80.

An important feature of the present invention is to reliably determine whether the receiver section 10 is being interrogated by an aircraft without decreasing the receiver sensitivity. To accomplish this, an output from the receiver subassembly module 32 is applied to an interrogation detector network 82 in the demand TACAN section 16. An output of the interrogation detector is a pulse signal applied to an input of demand TACAN control logic 84 producing an "inhibit" and "no inhibit" signal on a line 86 for additional control of the module 58.

Figure 3:
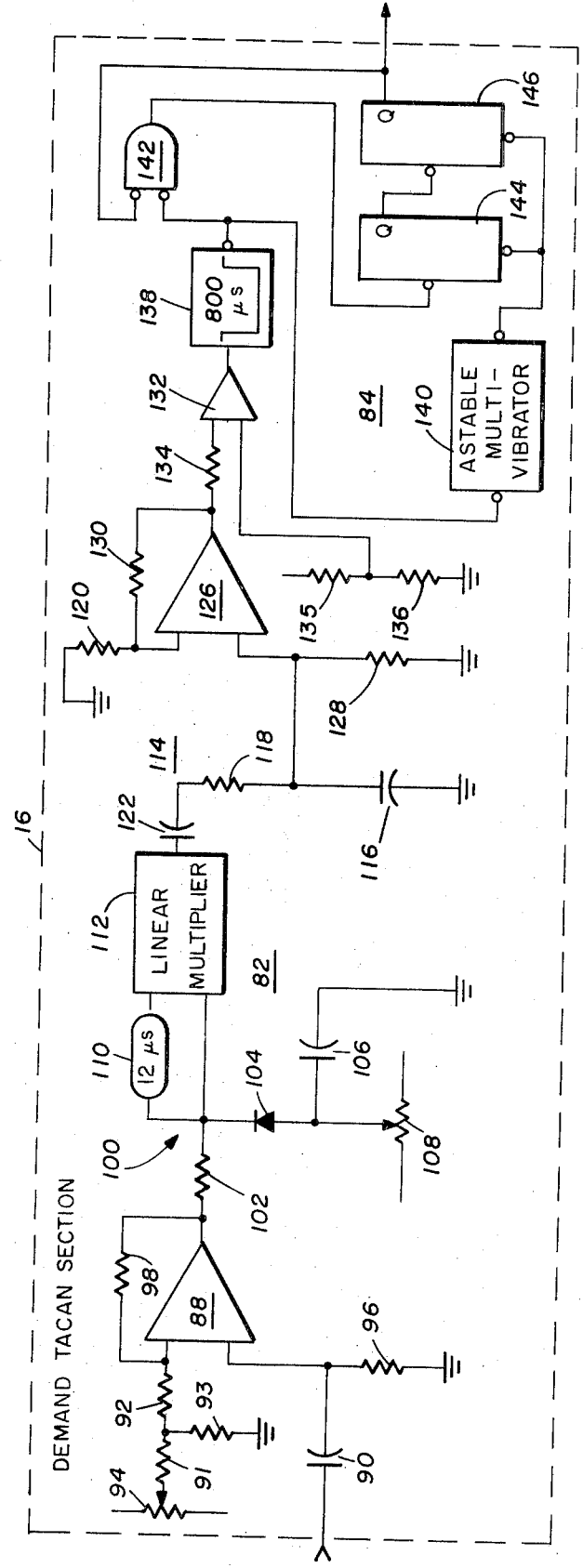
FIG. 3 is a block diagram of a pulse pair detector.

Referring to FIG. 3 there is shown a detail schematic of the demand TACAN section 16 including interrogation detector network 82 and the demand TACAN control logic 84. A signal from the receiver subassembly module 32 of the receiver section 10 is applied to the noninverting input of an amplifier 88 through a coupling capacitor 90 with a D.C. bias resistor 96. The inverting input of the amplifier 88 is tied to an offset adjusting potentiometer 94 through a resistor 92 and a resistor 91. A feedback path around the amplifier 88 includes a resistor 98 to the inverting input of the amplifier and the resistors 92 and 93 to ground. Thus, a signal from the receiver section 10 is amplified at the output of the amplifier 88 and has a waveform characteristic as shown in FIG. 4A.

A signal from the amplifier 88 is applied to a clipper circuit 100 including a resistor 102 and a diode 104 connected to ground through a capacitor 106 and a clipper adjustment potentiometer 108. The amplifier offset adjustment of the amplifier 88 is adjusted such that the output waveform as shown in FIG. 4A has a signal top of the blanking pulse at approximately zero volts D.C. This adjustment acts as a sensitivity control for the interrogation detector. More adjustment range is available in a system where the blanking pulse is not present in the receiver output. The positive clipper potentiometer 108 is adjusted to eliminate that portion of the signal below zero volts D.C. This eliminates the blanking pulse 54, if present, as shown in FIG. 2 as well as most of the low level noise pulses shown in this waveform.

Figure 4:
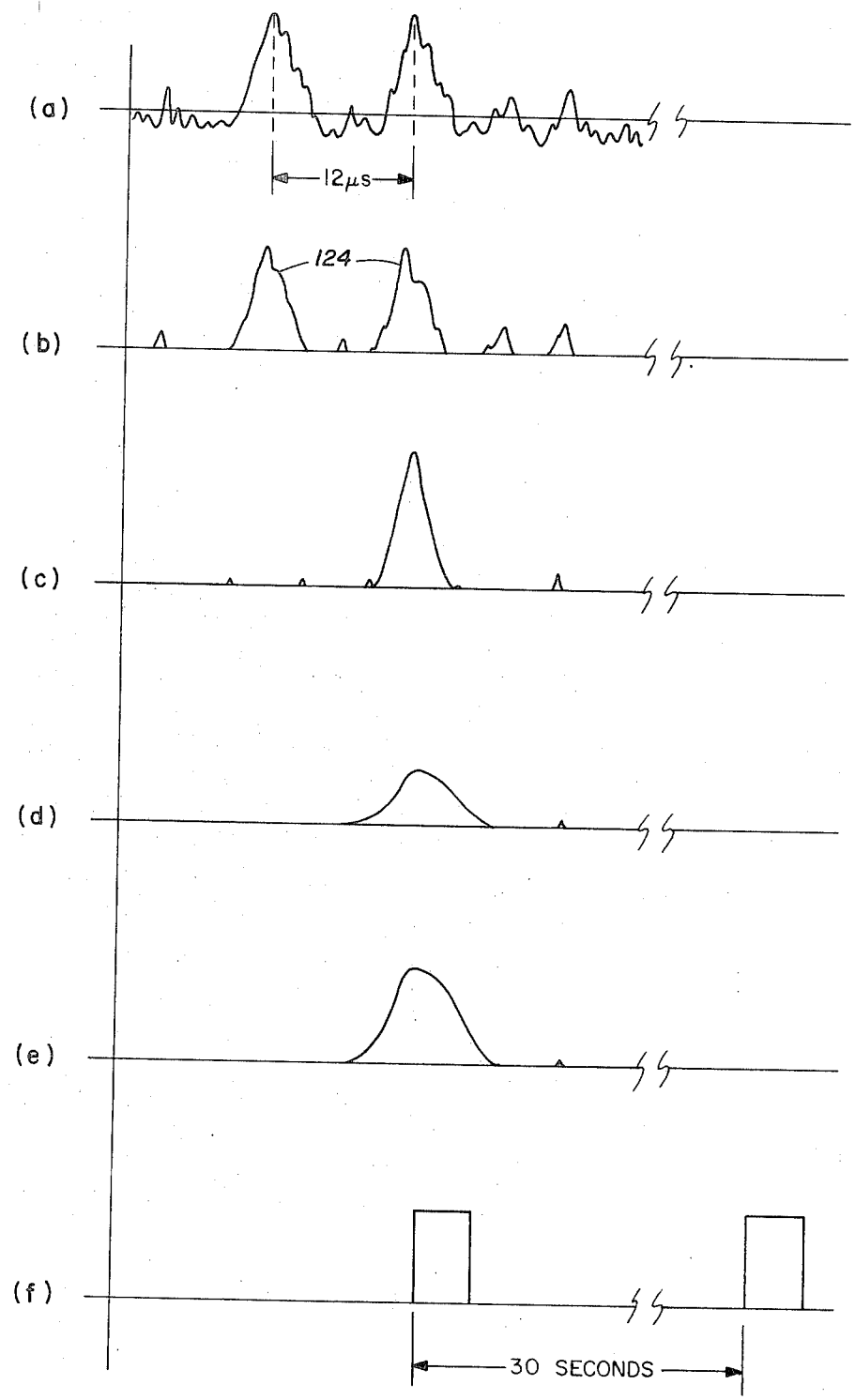
FIG. 4 is a series of waveforms for illustrating the operation of the pulse pair detector of FIG. 3.

A signal at the junction of the resistor 102 and the diode 104 has a waveform illustrated in FIG. 4B. This signal is applied to a modified correlator including a delay line 110, a linear multiplier 112 and an integrator 114. Integrator 114 includes a capacitor 116 to ground and resistor 118. A coupling capacitor 122 interconnects the output of the linear multiplier 112 to the integrator 114.

In operation of the correlator of the interrogation detector 82, for an aperiodic signal with finite energy the autocorrelation function $R_{ff}(\tau)$ is defined by the expression:

$$R_{ff}(\tau) = \int_{-\infty}^{\infty} f(t) f(t+\tau) dt$$

where $f(t)$ is an aperiodic function of time, $f(t+\tau)$ is $f(t)$ delayed by a sum time $\tau$, and $-\infty \leq \tau \leq \infty$. If the output of the positive clipper 100 is $f(t)$ then $R_{ff}(\tau)$ has three relative maximums, assuming one interrogation pulse pair 52 (FIG. 2) is present with a noise signal from a positive clipper 100. The largest maximum occurs at $\tau = 0$, when $f(t)$ is multiplied times itself and integrated with respect to time. However, this maximum is still at a somewhat high level even when no interrogation pulse pair 52 are present in the output of the positive clipper 100, because every noise pulse is multiplied times itself and integrated. The other two maximums of the correlator circuit occur at $\tau = T_p$ and $\tau = -T_p$. These maximums are useful, since video random noise pulses from the receiver module 32 are generally not overlapping and their contribution to the maximum is negligible. This results in improved signals to the noise ratio at these two maximums.

As the first pulse of the pair 52 emerges from the delay line 110 and is applied to one input of the multiplier 112, the second pulse is applied to the second input of the multiplier. Hence, the two pulses are linearly multiplied and produce a single output pulse from the multiplier 112 as given by the waveform of FIG. 4C. This output pulse is integrated to provide the desired signal $R_{ff}(\tau)$ for $\tau = T_p$. Since the noise pulses present in the output of the multiplier 112 are generally narrower than the interrogation pulse pair 52, they have a negligible contribution to the output of the integrator 118. Thus, the output of the integrator 118 is approximately zero volts D.C. except when properly spaced interrogation pulses 52 of sufficient amplitude are present at the output of the positive clipper 100.

An output pulse from the integrator 114, as illustrated by the waveform of FIG. 4D, is applied to the noninverting input of an amplifier 126 having a resistor 128 to ground. A feedback circuit for the amplifier 126 includes a resistor 130 connected to the inverting input and a resistor 120 to ground.

Following amplification in the amplifier 126, the output of the integrator 114 appears as the waveform of FIG. 4E. This signal is applied to a voltage comparator 132 through resistor 134. The comparator 132 compares the amplitude of the output of the amplifier 126 with a reference level as established by a resistance network including resistors 136 and 135 interconnected to the inverting input of the comparator 132. This yields a positive output from the comparator 132 whenever the input signal is above the reference level. This results in a single positive pulse as shown by FIG. 4F for each twelve microsecond pulse pair 52 (FIG. 2) of sufficient amplitude.

An output pulse from the voltage comparator 132 is applied to a single shot multi-vibrator 138. An interrogation pulse applied to the single shot 138 produces an 800 microsecond pulse applied to an astable multivibrator 140 and also to a NAND gate 142. An output from the gate 142 is applied to a flip-flop 144 having a Q-output terminal connected to a flip-flop 146. The gate 142 is enabled by an output from the flip-flop 146. Flip-flops 144 and 146 reset by an output of the astable multi-vibrator 140. An output of the flip-flop 146 is the transmit inhibit control signal on line 86 as applied to the control module 58 of the section 14.

In the demand TACAN system of the type described, the receiver-transmitter will not transmit until it receives interrogations from an aircraft. To provide this control and to prevent possible false triggering from activating the transmitter, the demand TACAN section 16 provides an "inhibit" signal or "no inhibit" signal to the control module 58. This inhibit-no inhibit signal is generated at the output of the demand TACAN control logic 84 and requires at least two input detected pulses from the interrogation detector 82 within a thirty second period to turn on the transmitter and at least one pulse each 30 seconds thereafter from the detector 82 to maintain the transmit condition.

In operation, when no pulse pair interrogations are being detected by the detector 82, the Q-output of the flip-flop 146 is at the inhibit level, thus providing a transmit inhibit signal to the control module 58. With no interrogation to the system, the astable multivibrator 140 provides an output pulse every 30 seconds to clear the flip-flops 144 and 146, thus maintaining the Q-output of these flip-flops at a low state. When a detected interrogation pulse, as shown in FIG. 4F, is applied to the single shot 138, an 800 microsecond pulse is applied to the astable multi-vibrator 140 which resets the 30 second time. The 800 microsecond pulse is also applied to the gate 142 which is enabled by the low signal from the Q-output of the flip-flop 146. The 800 microsecond pulse, therefore, passes through the gate 142 and causes the flip-flop 144 to change states with the Q-output thereof changing to a high level. If another interrogation pulse pair is detected within thirty seconds, the flip-flop 144 again changes states causing its Q-output to go to a low level and in turn causing the flip-flop 146 to change states. Since the flip-flop 146 has a low level output, a change in states, therefore, causes it to go high thereby disenabling the gate 142 and applying a "no inhibit" signal to the control unit 58. So long as interrogation pulse pairs are detected at intervals of less than 30 seconds, the astable multivibrator 140 does not produce an output pulse and the control and transmitter section 14 is allowed to transmit replies to the R.F amplifier and preselector module 20 to the antenna over the antenna line 18. If more than 30 seconds pass without a desired interrogation pulse pair, the astable multivibrator 140 clears the flip-flops 144 and 146 causing a transmit inhibit condition to exist on the line 86. Thus, the demand TACAN section 16 reliably determines whether interrogation pulses are present in the output of the receiver subassembly module 32 through the three step process of amplification, correlation and logic circuit triggering.

Whil only one embodiment of the invention, together with modifications thereof, has been described in detail herein and shown in the accompanying drawings, it will be evident that various further modifications are possible without departing from the scope of the invention.

What is claimed is:

1. A spaced pulse pair detector, comprising in combination:

amplifier means for receiving at an input thereto the spaced pulse pair and having means for biasing the output signal thereof to a preset level, a clipping circuit connected to the output of said amplifier means for limiting an output thereof to above the preset level, correlator means responsive to the output of said clipping circuit and having an output varying in accordance with a multiplication of the pulse pair, and means for detecting when the output of said correlating means exceeds an established level and generating a detection signal related thereto.

2. A spaced pulse pair detector as set forth in claim 1 wherein said correlator means includes:

a multiplier for generating an output signal related to a multiplication of the two input signals thereto, and delay means connected to one input of said multiplier for introducing a time delay into one signal to said multiplier.

3. A spaced pulse pair detector as set forth in claim 2 wherein the time delay introduced by said delay means equal the spacing between the pulse pair.

4. A spaced pulse pair detector as set forth in claim 2 wherein said correlator means further includes an integrator connected to the output of said multiplier and having an output varying as a ramp function.

5. A spaced pulse pair detector as set forth in claim 1 including means for adjusting the preset level of said means for biasing the output signal of said amplifier means.

6. A spaced pulse pair detector as set forth in claim 5 wherein said clipping circuit includes means for adjusting the level of output limiting.

7. In a radio navigation system, a station for receiving signals consisting of pulse pairs and for responding thereto, comprising:

means for receiving said pulse pair, and a pulse pair detector connected to said means and generating an interrogation signal when said means receives a pulse pair, including:

amplifier means for receiving at an input thereof the spaced pulse pair and having means for biasing the output signal thereof to a preset level, a clipping circuit connected to the output of said amplifier means for limiting an output thereof to above a preset level, correlator means responsive to the output of said clipping circuit and having an output varying in accordance with a multiplication of the pulse pair, and means for detecting when the output of said correlator means exceeds an established level and generating a detection signal related thereto.

8. In a radio navigation system as set forth in claim 7 wherein the means for biasing in said amplifier means includes means for adjusting the preset level of the bias of said amplifier means.

9. In a radio navigation system as set forth in claim 8 wherein said clipping circuit includes means for adjusting the level of output limiting.

10. In a radio navigation system as set forth in claim 7 wherein said correlator means includes:

a multiplier for generating an output signal related to a multiplication of the two input signals thereto, and delay means connected to one input of said multiplier for introducing a time delay into one signal to said multiplier.

11. In a radio navigation system as set forth in claim 10 wherein said correlator means further includes an integrator connected to the output of said multiplier and having an output varying as a ramp function.

12. In a radio navigation system as set forth in claim 7 wherein said means for detecting includes a comparator for comparing a reference level to the output of said correlator means and generating a detection pulse signal when the correlator means output exceeds the reference level.

* * * * *